United States Patent
Kató

(10) Patent No.: US 10,488,614 B2
(45) Date of Patent: Nov. 26, 2019

(54) SUPPORT STRUCTURE FOR AN OPTICAL FIBER CABLE

(71) Applicant: ING3 Beteiligungs GmbH, Vienna (AT)

(72) Inventor: Imre Kató, Gödöllö (HU)

(73) Assignee: ING3 Beteiligungs GmbH, Vienna (AT)

( * ) Notice: Subject to any disclaimer, the term of this patent is extended or adjusted under 35 U.S.C. 154(b) by 0 days.

(21) Appl. No.: 16/098,553

(22) PCT Filed: Feb. 27, 2017

(86) PCT No.: PCT/EP2017/000266
§ 371 (c)(1),
(2) Date: Nov. 2, 2018

(87) PCT Pub. No.: WO2017/148580
PCT Pub. Date: Sep. 8, 2017

(65) Prior Publication Data
US 2019/0146173 A1    May 16, 2019

(30) Foreign Application Priority Data
Mar. 2, 2016 (EP) ..................... 6000504

(51) Int. Cl.
*G02B 6/44* (2006.01)
*G02B 6/48* (2006.01)
*H02G 7/05* (2006.01)

(52) U.S. Cl.
CPC ........ *G02B 6/4471* (2013.01); *G02B 6/4433* (2013.01); *G02B 6/4435* (2013.01); *G02B 6/483* (2013.01); *H02G 7/053* (2013.01)

(58) Field of Classification Search
None
See application file for complete search history.

(56) References Cited

U.S. PATENT DOCUMENTS 5,678,609 A    10/1997    Washburn

FOREIGN PATENT DOCUMENTS

| EP | 3214473 | A1 | 9/2017 |
| GB | 2470284 | B | 11/2010 |
| GB | 2515628 | A | 12/2014 |
| JP | 2008129168 | A | 6/2008 |

*Primary Examiner* — Chad H Smith
(74) *Attorney, Agent, or Firm* — Steven M. Shape; Dennemeyer & Associates, LLC

(57) ABSTRACT

The invention relates to a support structure for an optical fiber cable (7) adapted to be aerially installed in a configuration, extending generally horizontally along a series of spaced apart vertical pilots, said support structure comprising: —An approximately c-shaped support element (2) with an open hollow (3), prepared for the incorporation of an optical fiber cable (7); —at least one longitudinal strength member (6) integrated in the c-shaped support element (2); —wherein the optical fiber cable (7) is movable arranged in the hollow (3) of the support element (2).

7 Claims, 4 Drawing Sheets

SUPPORT STRUCTURE FOR AN OPTICAL FIBER CABLE

CROSS-REFERENCE TO RELATED APPLICATIONS

This is a 35 U.S.C. 371 National Stage Patent Application of International Application No. PCT/EP2017/000266, filed Feb. 27, 2017, which claims priority to European application 16000504.7, filed Mar. 2, 2016, each of which is hereby incorporated by reference in its entirety.

FIELD OF THE INVENTION

The invention relates to the field of communication cables, and, more particularly, to a support structure for an aerial optical fiber cable.

BACKGROUND OF THE INVENTION

Communication cables employing optical fibers are widely used in the telecommunications industry. In particular, multifiber cables are widely used for long distance telephone communications, interexchange telephone applications, and other telephony and data transmission applications. Fiber optic cables are also being incorporated into cable television networks in place of more traditional coaxial cables. Optical fibers may permit long distances between signal repeaters or eliminate the need for such repeaters altogether. In addition, optical fibers offer extremely wide bandwidths and low noise operation.

A traditional used embodiment of fiber optic cables in telecom industry are the so called ADSS (All-Dielectric Self Supporting) cables. They typically include one central element surrounded by several fiber protecting tubes named "loose tube", since the internal diameter of these protective tubes are several times bigger than the diameter of the group of inserted fibers. There is an internal cable sheath placed around the group of loose tubes. Aramid layers are placed between the inner and an outer cable sheath. This aramid layers ensure the necessary tensile strength for the cable to be applicable for aerial implementations.

Another traditional aerial optical cable type, which has been used for trunk and backbone network applications for a long time is the so called "figure 8" type cable, which consists of a central element, surrounded by fiber protecting loose tubes. Around the loose tubes is a single cable sheath placed. This cable sheath is extruded together with a support element forming a single physical unit. The support element wire can be steel wire, rope or made from dielectric material like FRP (Fiber Reinforced Plastic). This support element wire (rope) ensures the necessary tensile strength for the cable and makes it applicable for aerial networks.

A common problem of all cable types is the high effort for their installation, which rises with the number of access closures.

SUMMARY OF THE INVENTION

In view of the foregoing background, it is therefore an object of the present invention to provide a support structure for an optical fiber cable that may be easily handled and installed in an aerial configuration.

The object of the invention is provided with a support structure for an optical fiber cable adapted to be aerially installed in a configuration extending generally horizontally along a series of spaced apart vertical pilots, said support structure comprising:

An approximately c-shaped support element with an Open hollow, prepared for, the incorporation of an optical fiber cable;

at least one longitudinal strength member integrated in the c-shaped support element wherein the optical fiber cable is movable arranged in the hollow of the support element;

The support element may preferably be composed of high-density polyethylene with several additives, and may have the form of a square with rounded edges, a hollow space in the center and a lateral opening on one corner of the square.

It is advantageous if the surface of the hollow of the support structure shows longitudinal ribs.

At least one of the longitudinal strength members can be made of fiber reinforced plastic material.

In a favourable embodiment two longitudinal strength members are extending along respective opposite sides of the hollow.

The size of the lateral opening of the hollow may be in the range of 65%-70% of the outside diameter of the optical fiber cable which has to be incorporated and the diameter of the hollow may be in the range of 125% to 150% of the optical fiber cables outside diameter.

DETAILED DESCRIPTION OF THE INVENTION

The invention will now be described more detailed h reference to the accompanying drawings, in which preferred embodiments of the invention are shown. However, the invention may be embodied in many different forms and is not limited to the embodiment set forth herein.

Figure 1:
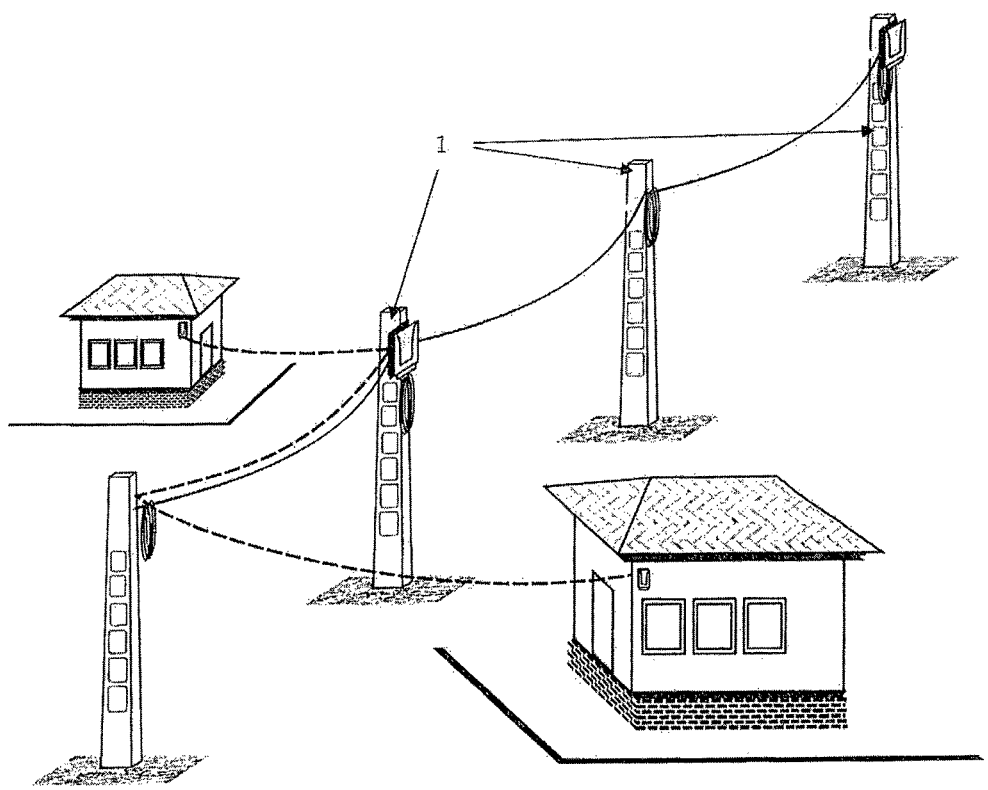
FIG. 1 shows a schematic view of an aerial portion of a fiber optic communications system.

As shown in FIG. 1, the inventive sup ort structure is tended to be used in the aerial part f an optical fiber communication network.

In such a network, a fiber optic cable 7 has to be aerially installed along a series of vertical supports or poles 1.

It has to resist the forces of nature, in particular the loads of wind or ice.

Self-supporting aerial cables, which meet these demands are relatively stiff and difficult to handle during installation.

According to the invention, this problem can be solved by using a support structure, which gives the optical fiber cable the required strength, brat simplifies the handling.

Figure 2A:
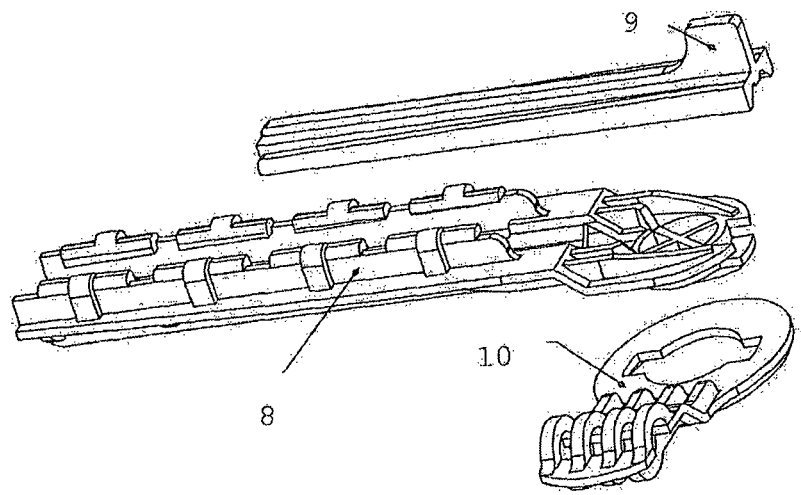
FIG. 2a, 2b show an exemplary embodiment of an anchoring frame in a separated and a mounted state.
Figure 2B:
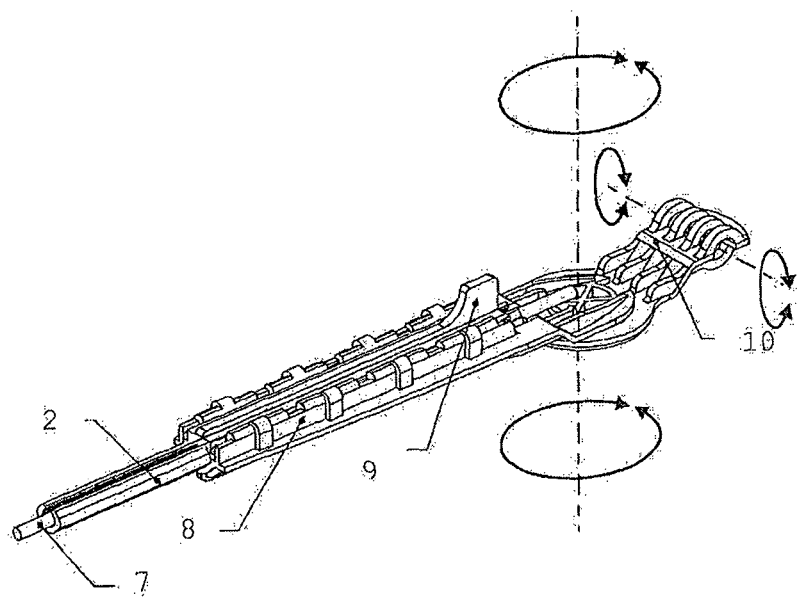

The support structure is secured to the end poles of the aerial network line by as shown in FIG. 2. The usage of anchoring frames is also recommended at those places, where aerial installation crosses roads or at corners of the line, that is to say, when deviation from the straight line exceeds 10 degrees.

On the other poles 1, holding brackets at shown in FIG. 3 are used for attachment.

Figure 4:
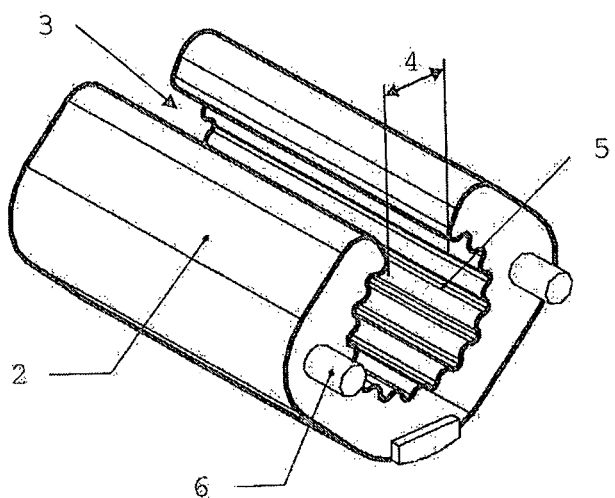
FIG. 4 shows an exemplary support element.

FIG. 4 shows a part of an inventive support element 2. It is composed of high-density polyethylene with several additives, which ensure resistance and reduce friction coefficient of the material.

Its cross section has approximately the form of a "C", in other words, it has the form of a square with rounded edges, a hollow space 3 in the center and a lateral opening 4 on one corner of the square.

The surface of the hollow 3 shows longitudinal ribs 5.

To increase the stability of the support element 2, a pair of longitudinal strength members 6 extending along respective opposite sides of the hollow 3 is incorporated in its body.

They are made of fiber reinforced plastic material.

The symmetrical design is an important feature of the support element 2; it helps to maintain the straight form of the extruded element during manufacturing and during the cooling and crystallization process.

The longitudinal ribs 5 in the surface of the hollow 3 ensure lower dragging forces for pulling the inserted cable 7 by reducing friction surfaces.

It is advantageous to mark the back side of the support element 2 with an embedded strip extruded using different color of material. It is to signalize twisting of the supporting element between neighboring poles 1. In order to maximize cable pulling performance of the system, a 360° twisting is required between poles 1. Back side color strip makes it easily controllable also for installers and for supervising staff.

The physical size of the support element 2 determined by the outside diameter of the applied optical fiber cable 7. There are two critical parameters. One is the size of lateral opening 4 of the hollow 3, which should be in the range of 65%-70% of the outside diameter of the cable 7.

The second critical parameter is the diameter of the hollow 3, which should be between 125% and 150% of the cables 7 outside diameter.

The cuter dimension of the support element 2 is derived from these parameters and the necessary wall thickness to reach the pre-defined values for the stability of the element.

As shown FIG. 2 *a*, the anchoring frame for attaching the support element to vertical poles comprises three major components; a frame body 8 which guides the support element 2 with some hook-like forms at each side; a support element 2 specific clamping wedge 9 with a bottom surface which has the negative form of the upper part of the support element 2, so it fits perfectly to the support element 2 when the clamping wedge 9 is inserted into the body 8 of the anchoring frame right over the support element 2.

The way of insertion during an installation process is from the front to the back of the frame body 8. While the clamping wedge 9 is moved backward, hooks at the side press the clamping wedge down towards the support element 2 until the desired clamp force is reached.

The third basic component of the anchoring frame is a bridging arm 10, which connects the frame body 8 to a pole 1.

FIG. 2 *b* shows the anchoring frame in a mounted state.

The inventive system allows different movements of the support element 2 but not twisting. So the opening of the support element 2 will always face upward.

It is recommendable to manufacture the whole anchoring frame from dielectric materials, because it avoids any needs for grounding, when the aerial network is realized on 0.4 kV energy poles.

Figure 3A:
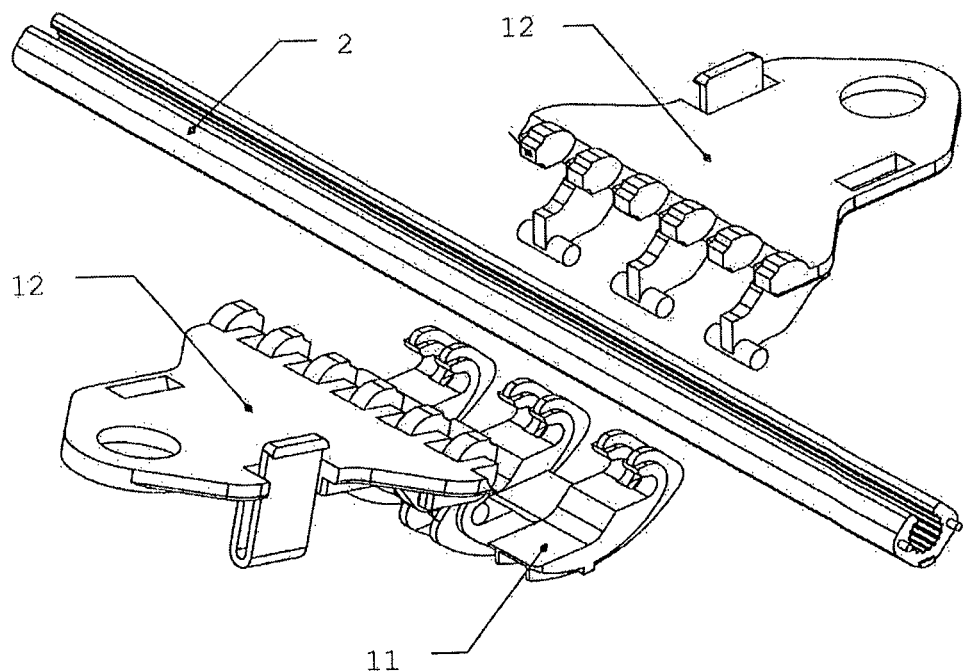
FIG. 3a, 3b show an example for a holding bracket in a separated and a mounted state.

As described in the foregoing, the application of the anchoring frame is only recommended at certain poles 1. On the other poles 1, bolding brackets as shown in FIG. 3*a* in a separated state and in FIG. 3*b* in a mounted state are used for attachment.

Theses holding brackets comprise 3 components, a bracket base. 11 and two turnable side plates 12. The side plates 12 are identical to each other, any of them can be used at the left or right side as well.

Figure 3B:
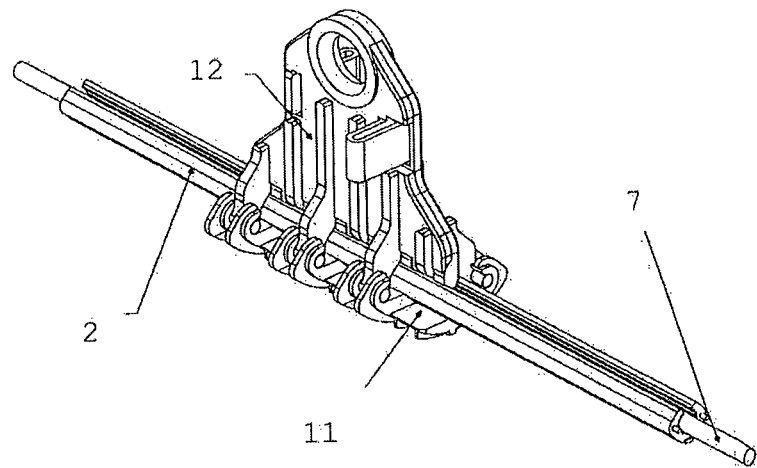

FIG. 3*b* shows the mounted holding bracket with the support structure 2 and the optical fiber cable 7 inside.

The installation process comprises the following steps:

At first the support element 2 with the inserted optical fiber cable 7 is placed into the holding bracket base 11 whereby the open side of the support element 2 faces upward While the side plates 12 are turned up, profile blocks located at the lower section of the side plates 12 push down the inserted support element 2 into the holding bracket base 11. It fastens the support element 2 into the holding bracket.

Figure 5:
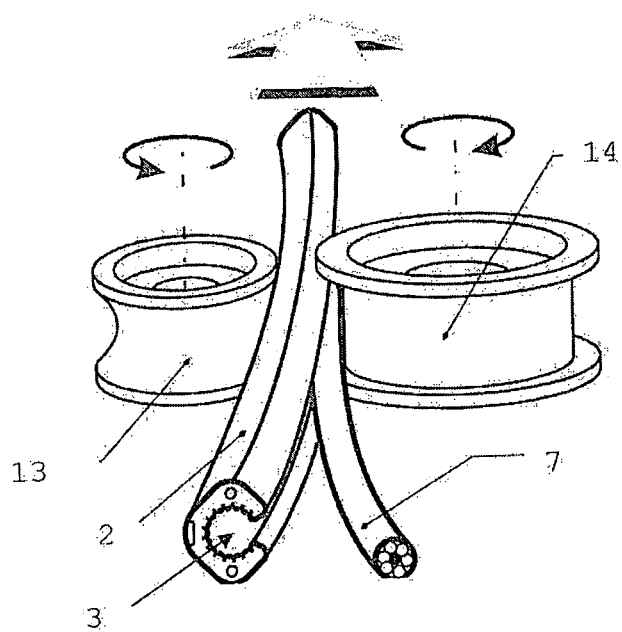
FIG. 5 shows the assembly process of support element and optical fiber cable.

The process of inserting an optical fiber cable 7 into a support element 2 is described in context with FIG. 5.

The cable 7 is pressed through the lateral opening 4 into the hollow 3 of the support element 2 by help of some rollers 13, 14.

A first type of rollers 13 is designed to position and hold the support element 2 in a fixed position while a second type of rollers 14 presses the cable 7 into the support element 2.

REFERENCES

1 poles
2 support element
3 hollow
4 lateral opening
5 longitudinal ribs
6 longitudinal strength members
7 cable
8 frame body
9 clamping wedge
10 bridging arm
11 bracket base
12 side plates
13 first type of rollers
14 second type of rollers

The invention claimed is:

1. A support structure for an optical fiber cable adapted to be aerially installed in a configuration extending generally horizontally along a series of spaced apart vertical pilots, said support structure comprising:
   a c-shaped support element with an open hollow, configured for the incorporation of an optical fiber cable; and
   at least one longitudinal strength member integrated in the support element,
   wherein the optical fiber cable is movably arranged in the hollow of the support element, and
   wherein the support element has the form of a square with rounded corners, the hollow in a center of the support element and a lateral opening on a first rounded corner of the square.

2. The support structure according to claim 1, wherein the support element is composed of high-density polyethylene with several additives.

3. The support structure according to claim 1, further comprising a plurality of longitudinal ribs formed on a surface of the hollow.

4. The support structure according to claim 1, wherein the at least one longitudinal strength member is made of a fiber reinforced plastic material.

5. The support structure according to claim 1, wherein two longitudinal strength members extend along respective opposite sides of the hollow.

6. The support structure according to claim 1, wherein a width of the lateral opening of the hollow is in the range of 65% to 70% of an outer diameter of the optical fiber cable.

7. The support structure according to claim 1, wherein a diameter of the hollow is in the range of 125% to 150% of an outer diameter of the optical fiber cable.

\* \* \* \* \*